Nov. 13, 1934.  L. C. SHIPPY ET AL  1,980,359
METAL CUTTING MACHINE
Filed July 12, 1929    9 Sheets-Sheet 1
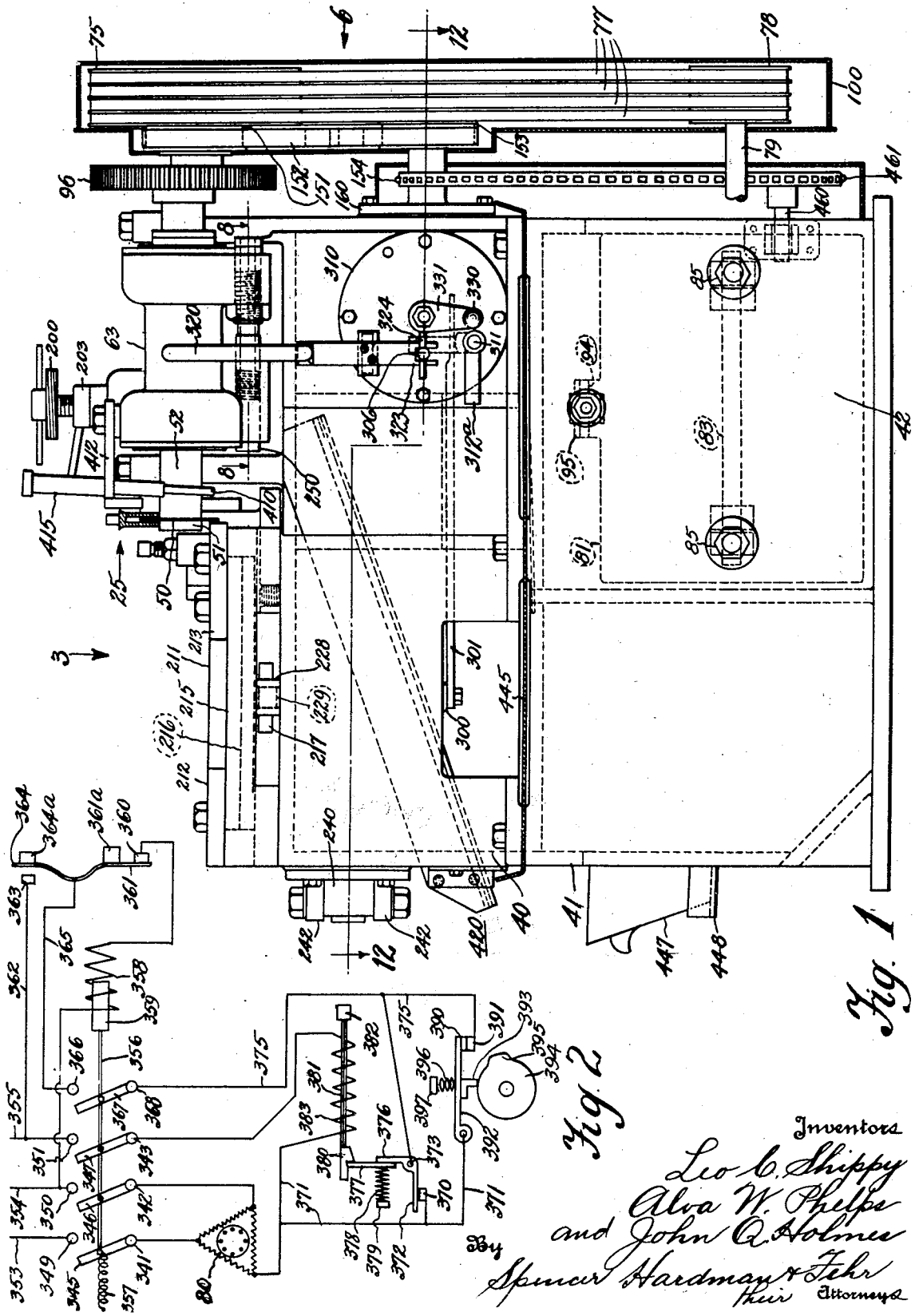

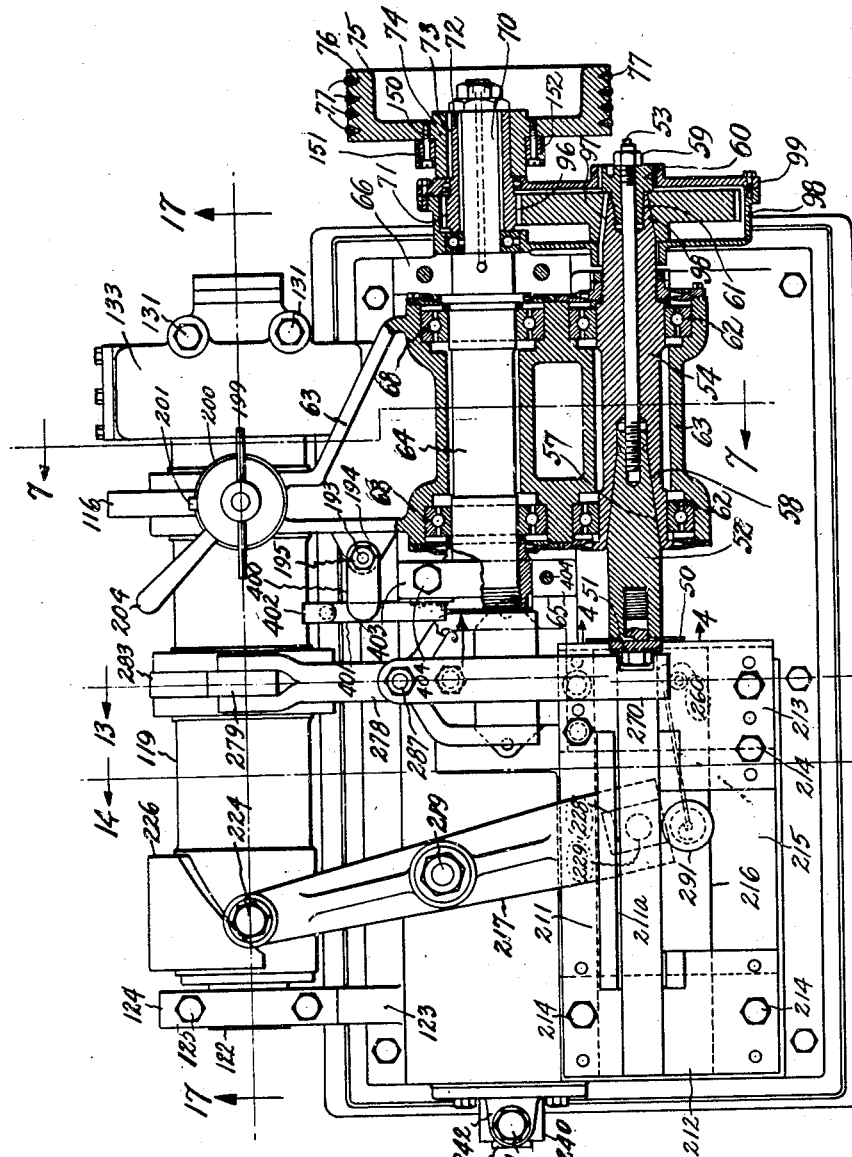
Fig. 3
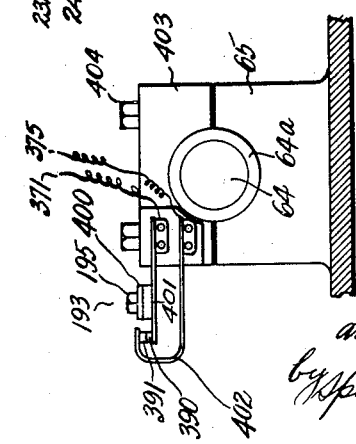
Fig. 4
Fig. 5
Inventors
Leo C. Shippy
Alva W. Phelps
and John O. Holmes
by Spencer Hardman & Fehr
their Attorneys Nov. 13, 1934. L. C. SHIPPY ET AL 1,980,359
METAL CUTTING MACHINE
Filed July 12, 1929 9 Sheets-Sheet 3
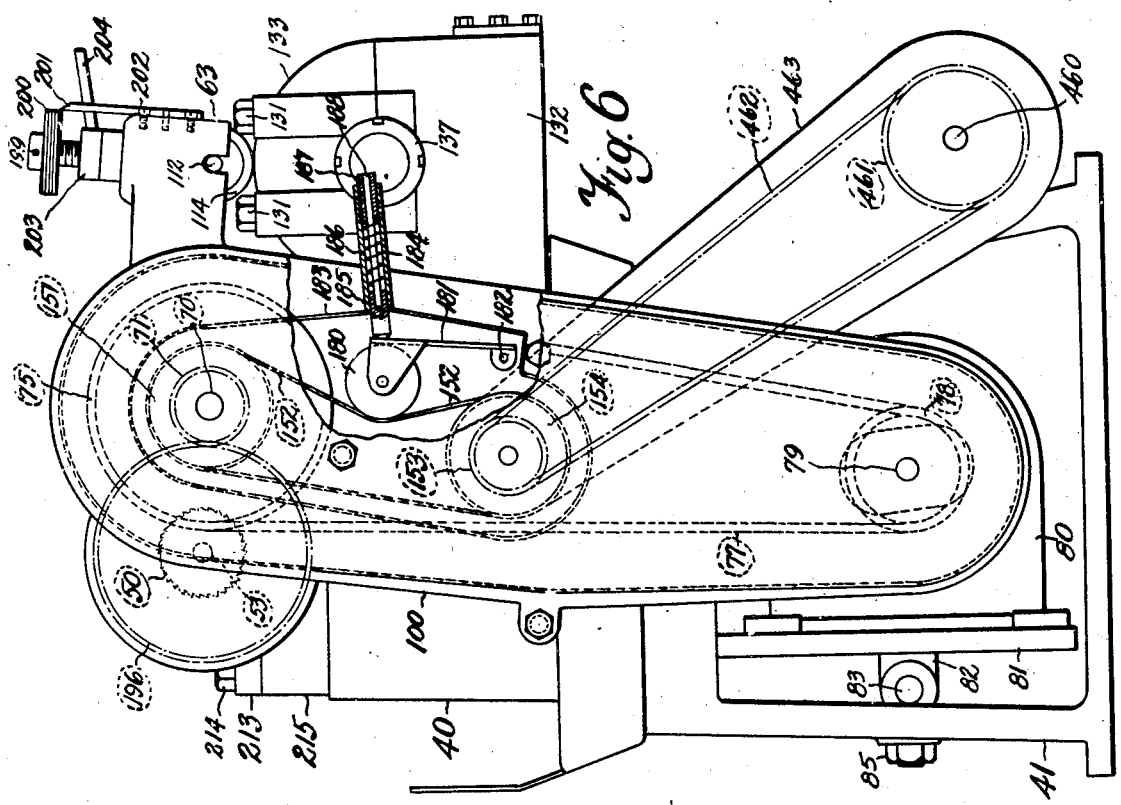
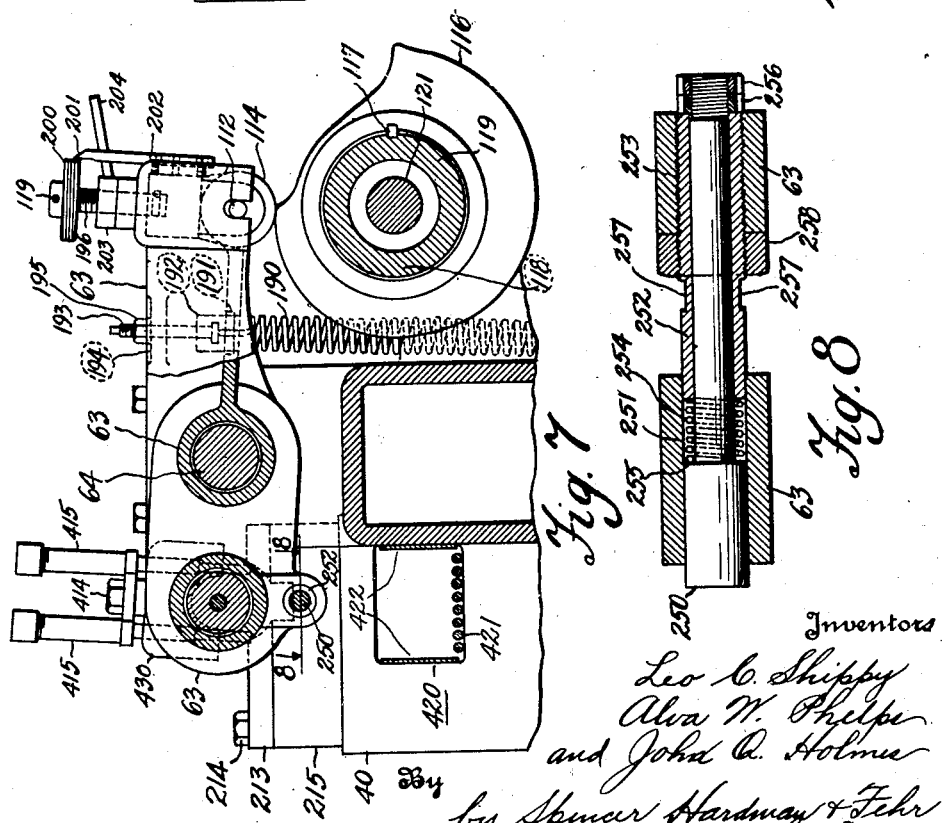
Inventors
Leo C. Shippy
Alva W. Phelps
and John Q. Holmes
By Spencer Hardman & Fehr
their Attorneys

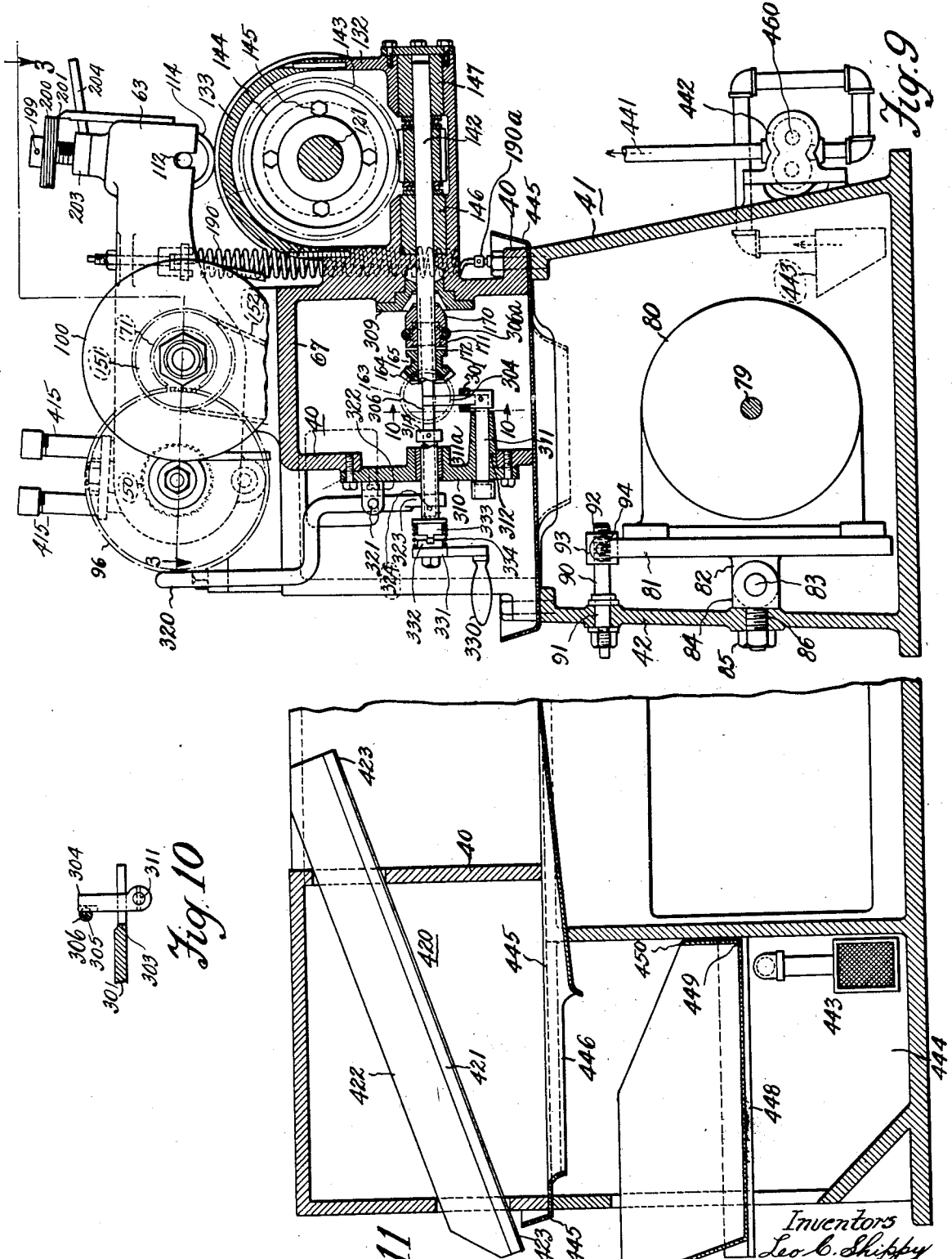

Nov. 13, 1934.    L. C. SHIPPY ET AL    1,980,359
METAL CUTTING MACHINE
Filed July 12, 1929    9 Sheets-Sheet 5
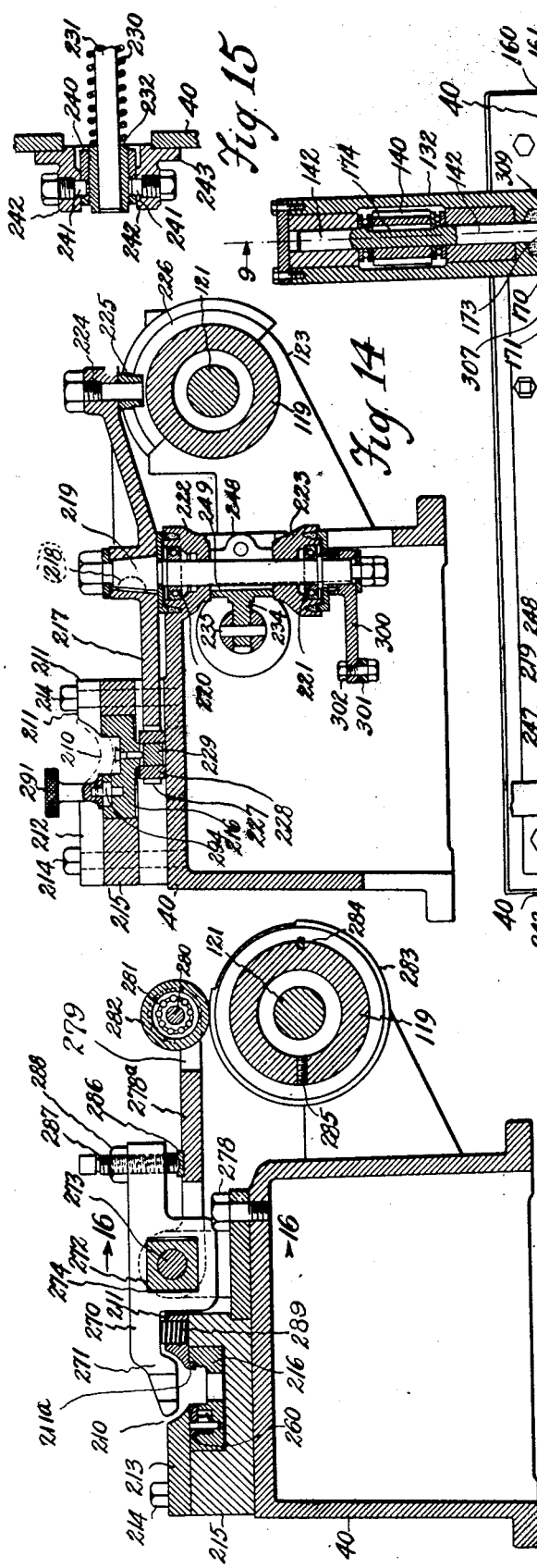
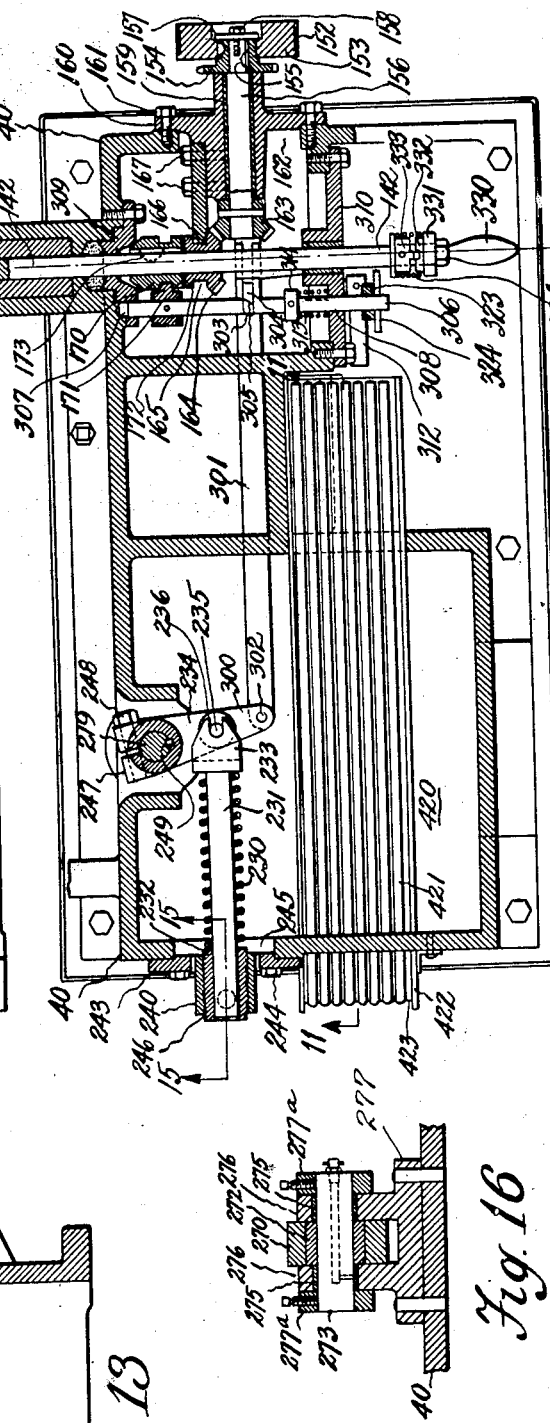
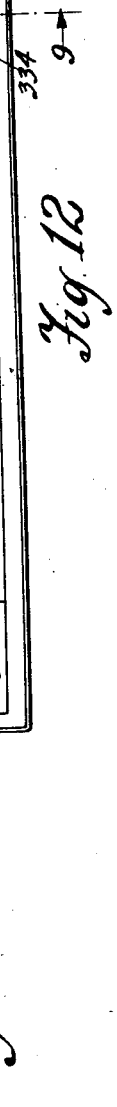
Inventors
Leo C. Shippy
Abva W. Phelps
and John O. Holmes
By Spencer Hardman & Fehr
their Attorneys

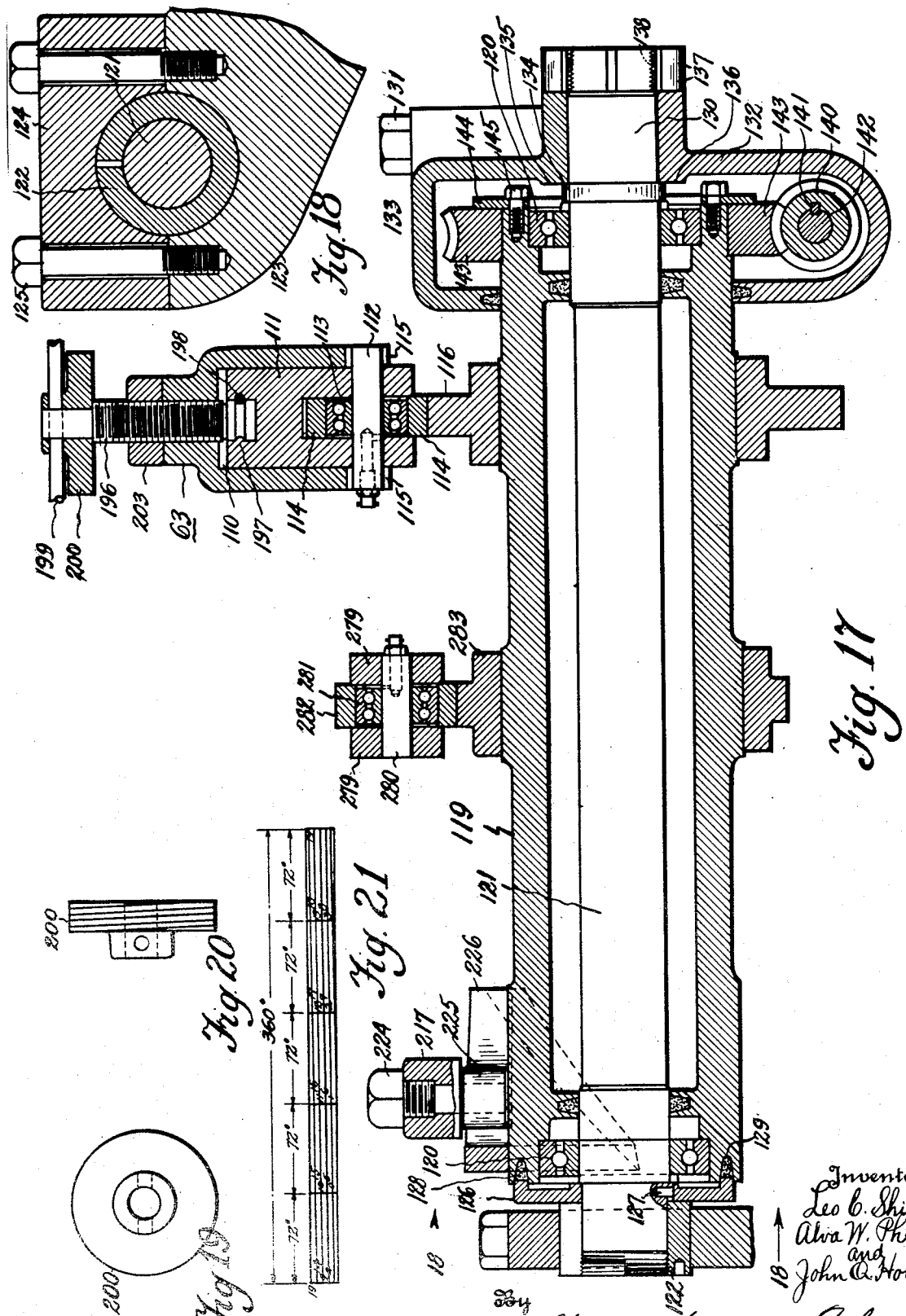

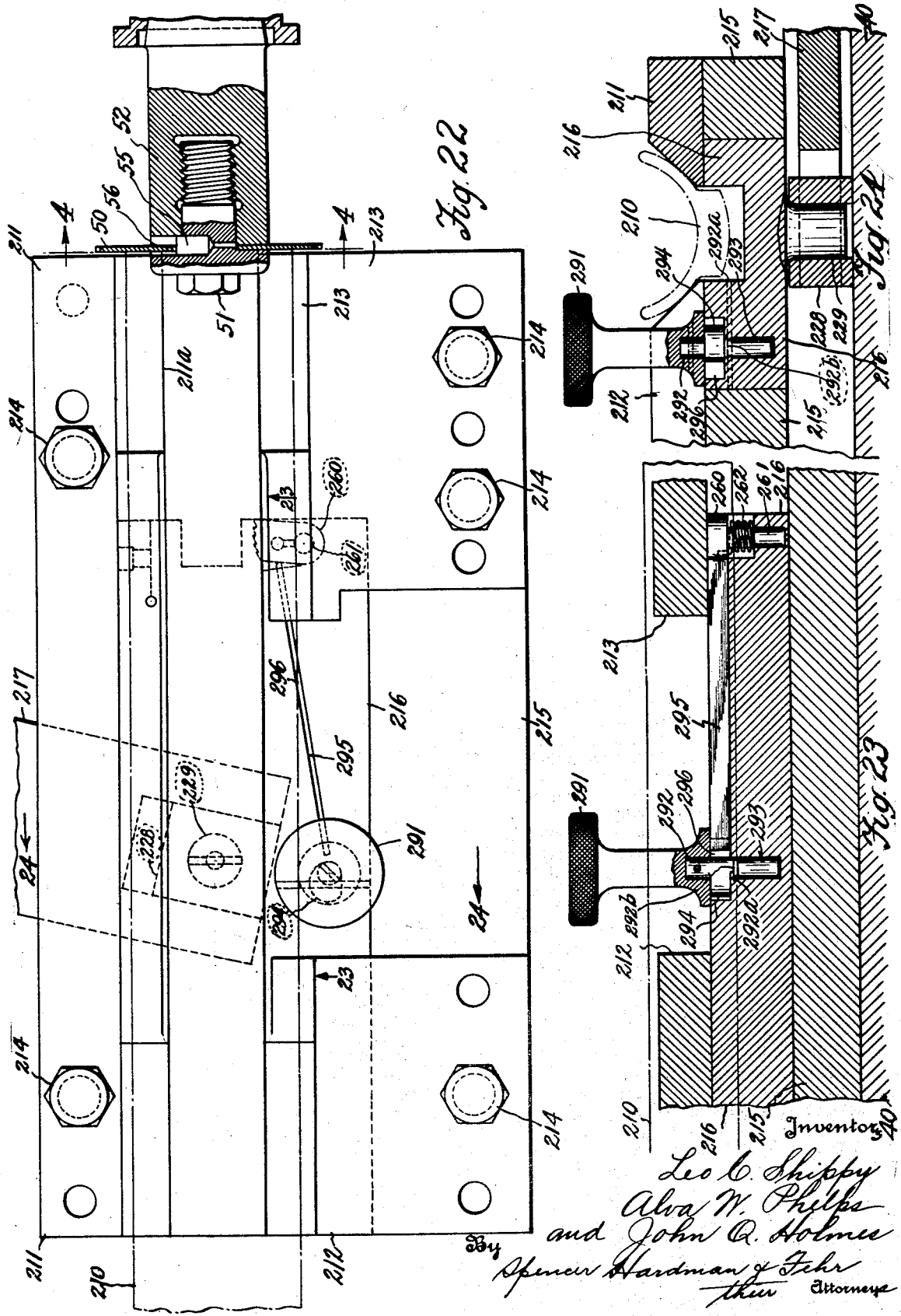

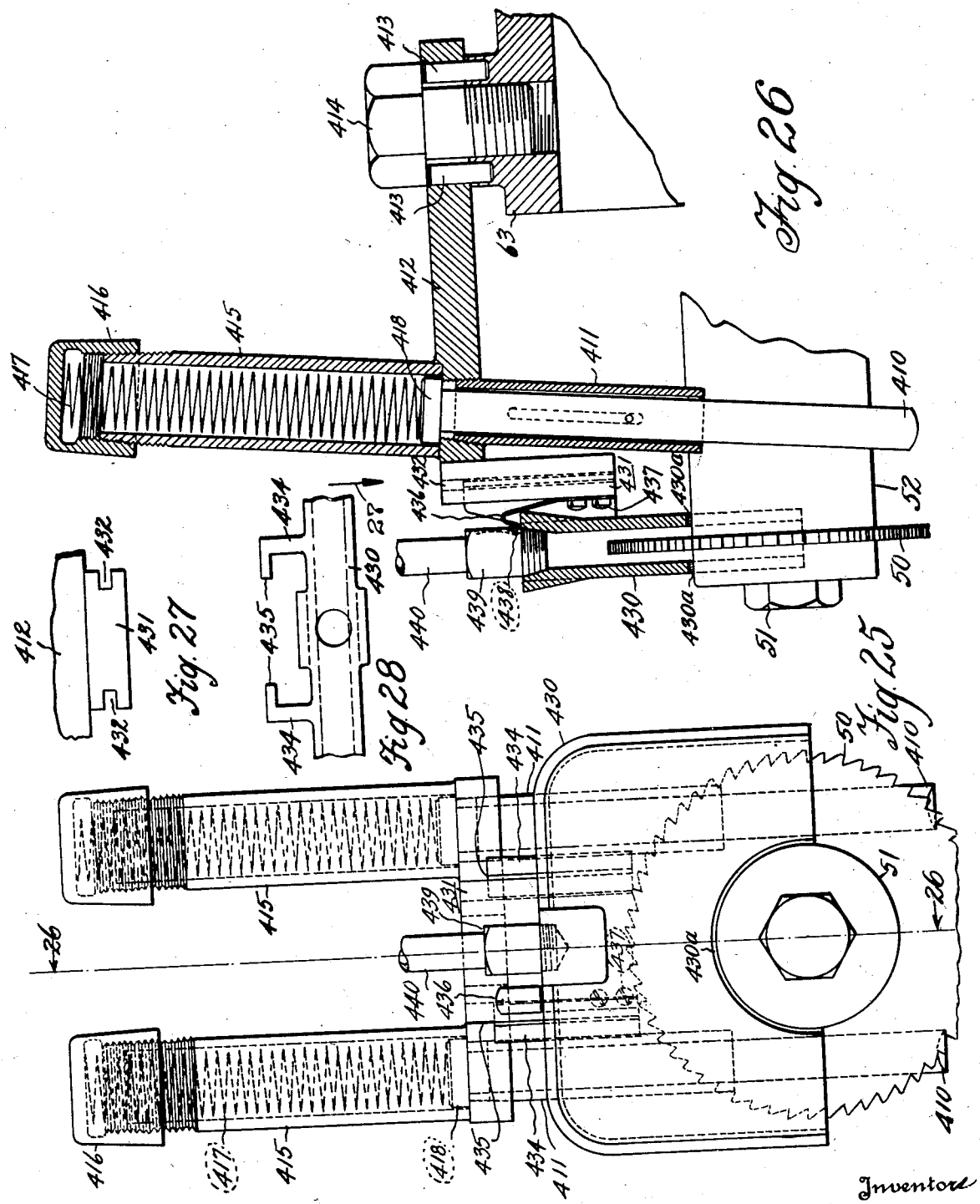

Patented Nov. 13, 1934

1,980,359

UNITED STATES PATENT OFFICE 1,980,359

METAL CUTTING MACHINE

Leo C. Shippy, Alva W. Phelps, and John Q. Holmes, Anderson, Ind., assignors, by mesne assignments, to General Motors Corporation, Detroit, Mich., a corporation of Delaware Application July 12, 1929, Serial No. 377,778

15 Claims. (Cl. 29—69)

This invention relates to machinery for cutting metal bars into shorter lengths and includes among its objects the provision of a machine having an automatic work feed and which may be constructed economically and which is capable of operating faster than heretofore.

A further object of the invention is to provide for automatically stopping the machine after completing the cutting of a bar of stock into pieces.

Another object of the invention is to provide for automatically stopping the machine when the cutter has been dulled to a certain extent.

Further objects and advantages of the present invention will be apparent from the following description, reference being had to the accompanying drawings wherein a preferred embodiment of one form of the present invention is clearly shown.

In the drawings:

Fig. 1 is a side elevation of a machine embodying the present invention.

Fig. 2 is a wiring diagram illustrating the means for stopping the machine by stopping the electric motor which drives it after the cutter has been dulled to a certain extent.

Fig. 3 is a plan view of the machine shown in Fig. 1, certain parts being shown in sections, the section being taken on the line 3—3 of Fig. 9.

Fig. 4 is a sectional view taken on the line 4—4 of Fig. 3.

Fig. 5 is a sectional view on the line 5—5 of Fig. 3.

Fig. 6 is an end view of the machine shown in Fig. 1 looking in the direction of the arrow 6 of Fig. 1.

Fig. 7 is a sectional view on the line 7—7 of Fig. 3.

Fig. 8 is a sectional view on the line 8—8 of Figs. 1 and 7.

Fig. 9 is an end view partly in section, section being taken on the line 9—9 of Fig. 12.

Fig. 10 is a sectional view on the line 10—10 of Fig. 9.

Fig. 11 is a sectional view taken on the line 11—11 of Fig. 12.

Fig. 12 is a sectional view on the line 12—12 of Fig. 1.

Fig. 13 is a sectional view on the line 13—13 of Fig. 3.

Fig. 14 is a sectional view on the line 14—14 of Fig. 3.

Fig. 15 is a sectional view on the line 15—15 of Fig. 12.

Fig. 16 is a sectional view on the line 16—16 of Fig. 13.

Fig. 17 is a sectional view on the line 17—17 of Fig. 3.

Fig. 18 is a sectional view on the line 18—18 of Fig. 17.

Figs. 19 and 20 are plan views and side views respectively of the graduated head or an adjusting screw used for varying the minimum distance between the work and the axis or rotation of the cutters.

Fig. 21 is a development view of the indicia on the periphery of the adjusting screw head.

Fig. 22 is a fragmentary view on a larger scale than the preceding figures and shows a portion of the mechanism for feeding the work.

Fig. 23 is a fragmentary sectional view on the line 23—23 of Fig. 22.

Fig. 24 is a fragmentary sectional view on the line 24—24 of Fig. 22.

Fig. 25 is a view looking in the direction of the arrow 25 in Fig. 1 and shows the rotary cutter or saw enclosed by a guard which provides a nozzle for directing lubricants upon the cutters, and also shows a device for yieldingly pressing upon the piece of bar stock which is being severed by the saw from the remaining piece.

Fig. 26 is a sectional view on the line 26—26 of Fig. 25.

Figs. 27 and 28 are fragmentary plan views looking in the direction of arrow 27 in Fig. 26 and show the manner of detachably securing the nozzle or saw guard to its supporting bracket.

Figure 29:
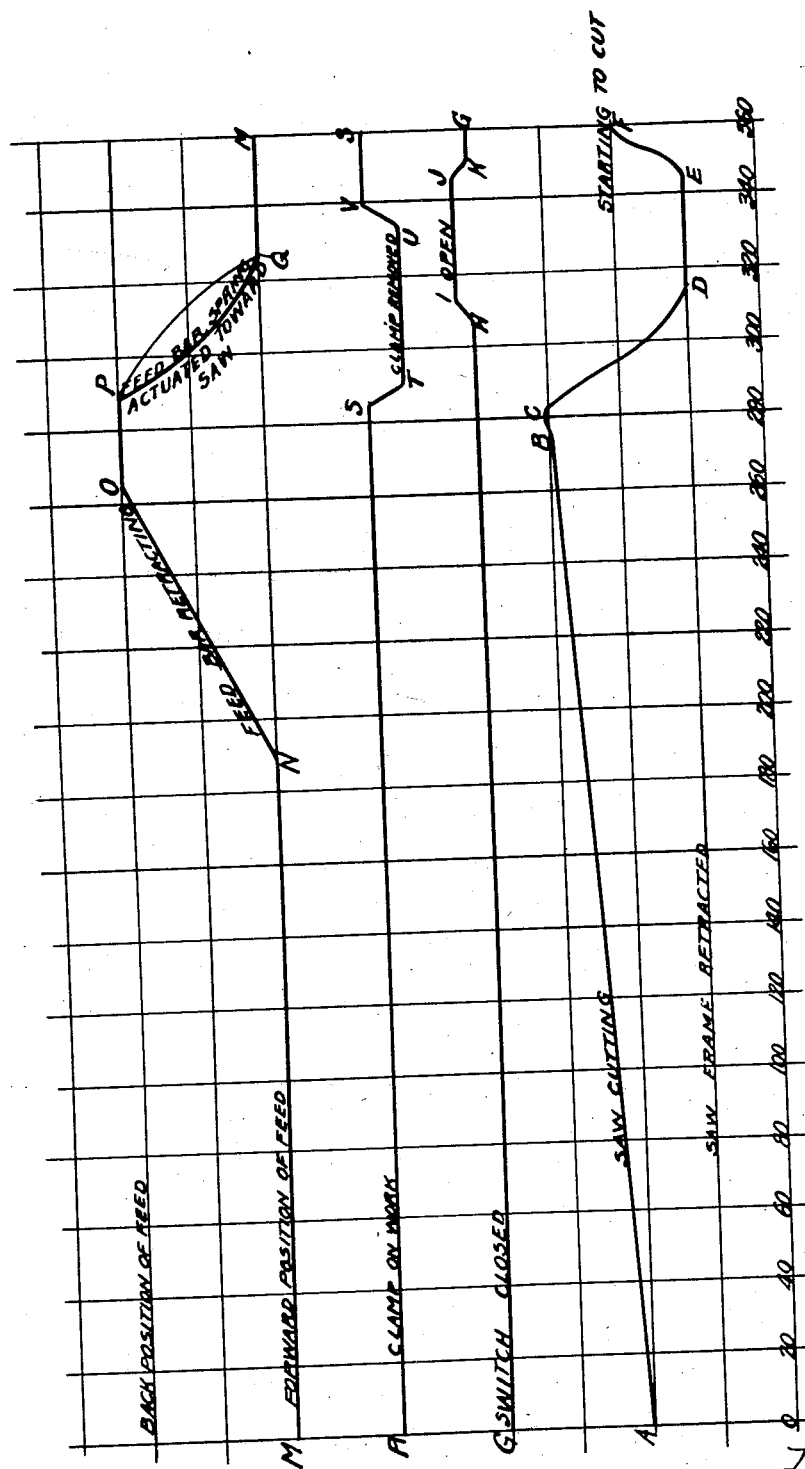
Fig. 29 is a chart showing the sequence of operations of various parts of the machine.

*The rotary cutter, its supporting frame and driving mechanism*

The rotary cutter or saw designated by numeral 50 in Figs. 1 and 3 is detachably secured by screw 51 to a cutter holder 52 attached by screw 53 to a spindle 54 by which the saw 50 is supported and driven. The saw 50 cannot be turned relative to the screw 51 because a pin 55 carried by the screw 51 is received by a notch 56 in the saw 50. The parts 52 and 54 are provided with inter-fitting conical surfaces 57 and 58 respectively which transmit rotary movement from the spindle 54 to the saw 50 when a nut 59 is turned along the screw 53 toward the left until it bears firmly against a screw 60 which threadedly engages the spindle 54 at 61. The spindle 54 is journalled in ball bearings 62 carried by the saw supporting frame 63 which is pivotally supported by a rod 64 attached to clamp brackets 65 and 66 carried by the upper platform 67 of the mechanism supporting frame 40 which rests upon a base frame 41. The saw frame 63 carries the ball bearings 68 by which the frame 63 is journalled upon the rod 64. Rod 64 is provided with an extension 70 of less diameter than those portions which support the bearing 68. The part 70 provides a journal for a gear 71 having its hub 72 drivingly connected by a key 73 with a hub 74 of a belt pulley 75 having a plurality of grooves 76. These grooves each receive a belt 77, and the belts 77 pass around a similarly grooved belt pulley 78 mounted upon the armature shaft 79 of an electric motor 80. The motor 80 which is particularly shown in Fig. 9 is attached to a vertical bracket 81 carrying lugs 82 having suitable aligned holes for receiving a hinge rod 83 passing through aligned holes in lugs 84 which are attached to the side wall 42 of the machine base 41 by screws 85 which cooperate with the threaded shanks 86 of the lugs 84. When it is desired to tighten the belts 77 the motor supporting bracket 81 is adjusted so as to move the motor shaft 79 in a clockwise direction. This adjustment is effected by turning a threaded rod 90 having a portion 91 which passes through a suitable hole in the side wall 42 and which has a threaded portion 92 threadedly engaging the nut 93 which is pivotally attached to the motor bracket 81 by pivot pins 94 supported by ears 95 integral with the bracket 81. The gear 71 drives a gear 96 which is drivingly connected by a key 97 with the tapered right hand end 98 of the saw spindle 54. The screw 60 which threadedly engages the spindle 54 retains the gear 96 in position upon the spindle. It is therefore apparent that the motor will drive the pulley 78, belt 77, pulley 75, gear 71, gear 96, spindle 54 and saw 50.

The gears 71 and 96 are enclosed by a gear case 98 having a suitable cover 99. The belts 77 are enclosed by suitable belt guard 100 which is secured to the machine frame in any suitable manner.

*Mechanism for oscillating the saw frame*

The mechanism for oscillating the saw frame will now be described with particular reference to Figs. 7 and 17. The frame 63 provided at its right hand end as viewed in Fig. 7 with a tubular portion 110 providing a socket for receiving a block 111 carrying a rod 112 which supports a ball bearing 113 providing a journal for a roller or a cam follower 114. The ends of the rod 112 are received by notches 115 in the part 110. The roller 114 cooperates with a cam 116 attached by a key 117 or other suitable means, to a hollow cam shaft 119 supported upon ball bearings 120 carried by a nonrotatable rod 121. The rod 121 is threadedly engaged at its left end by a split nut 122 which is clamped in position between a clamp bracket 123 provided by the machine frame 40 and a clamp cap 124 which is secured to the bracket 123 by screws 125 as shown in Fig. 18. The nut 122 secures in position a retainer plate 126 attached to the rod 121 by a key 127. The retainer 126 bears against a felt packing ring 128 located in an annular groove 129 in the left end of the cam shaft 119. The right hand end portion 130 of the rod 121 is clamped by screws 131 between a bracket 132 and a clamping cap 133. The rod 121 is provided with a shoulder 134 which may be brought to bear against a surface 135 of the bracket clamp 133 and the surface 136 of the bracket 132 by turning the nuts 137 threadedly engaging the right hand end of the rod 121 indicated by numeral 138.

The bracket 132, which as shown in Fig. 9 is integral with the machine frame 40 cooperates with the bracket clamp 133 to provide a housing for a worm 140 attached by a key 141 to a shaft 142 and meshing with a worm gear 143 mounted upon and drivingly connected with the cam shaft 119. The worm gear 143 is retained upon the shaft 119 by a plate 144 attached to shaft 119 by screws 145. The shaft 142 is journalled in bearings 146 and 147 carried by the bracket 132.

The shaft 142 is driven by the pulley 75 to which is attached by screws 150 a belt pulley 151 around which is passed a belt 152 which passes also around a pulley 153 which is drivingly connected with a sprocket gear 154 drivingly connected by key 155 with a shaft 156 as shown in Fig. 12. A retainer plate 157 attached by a screw 158 to the shaft 156 retains the pulley 153 and the sprocket 154 upon the shaft 156. Shaft 156 is journalled in a tubular bearing 159 carried by bearing bracket 160 which is attached by screws 161 to the machine frame 40 and serves as a cover closing an opening 162 in the frame 40. The shaft 156 drives a bevel gear 163 meshing with a bevel-gear 164 which is provided with a hub having an annular groove 165 which receives one end of a plate 166 attached by screws 167 to bearing bracket 160. The plate 166 retains the gear 164 in a definite position relative to the shaft 142. The gear 164 is not directly connected with the shaft 142 but may be connected with it by an endwise shiftable clutch member 170 having adjacent its face a number of clutch teeth 171 engageable with similar clutch teeth 172 provided at the adjacent face of the gear 164. Thus it is seen that the cam shaft 119 is driven by the electric motor 80 through shaft 79, pulley 78, belts 77, pulley 75, pulley 151, belt 152, pulley 153, sprocket 154, shaft 156, gear 163, gear 164, clutch teeth 172, clutch teeth 171, clutch member 170, key 173, shaft 142, key 174, worm 140, worm gear 143.

The belt 152 is kept taut by a belt tightening device comprising a wheel 180 adapted to bear against the belt 152 as shown in Fig. 6 and pivotally supported by a bracket 181 hinged at 182 upon a belt guard 183 which encloses the belt 152 and is attached to the larger belt guard 100. The guard 183 carries a tube 184 through which slides a plunger 185 urged by a spring 186 in a direction so as to bear against the bracket 181 toward the left so as to urge the tightener wheel 180 into the position shown in Fig. 6. The spring 186 is retained by a tubular plug 187 threaded into the right hand end of the tube 184 and providing a guide for a rod 188 which extends through the spring 186 and threadedly engages the plunger 185.

The cam follower roller 114 is yieldingly maintained in engagement with the cam 116 by a spring 190 anchored at its lower end 190a to the machine frame 40 (see Fig. 9) and at its upper end to a pin 191 carried by a yoke 192 attached to the lower end of a screw 193 which passes through a plain hole in an ear 194 projecting from the saw frame 63. A nut 195 threaded on the screw 193 engages the upper surface of the ear 194. By turning the nut 195 the tension in the spring 190 is adjusted.

When a saw 50 becomes dull it may be removed and reground in order to render it fit for further service. The regrinding to sharpen the saw piece will educe the diameter of the saw. In order that the cam 116 will so cooperate with the saw frame 63 that the saw 50 will cut clear through the work it is necessary to adjust the position of the roller 114 relative to the frame 63. This adjustment is effected by shifting the position of the block 111 within the recess 110 provided by the frame 63 as shown particularly in Fig. 17. In order that the block 111 may be shifted it is swivelly connected with a screw 196 having threaded engagement with the frame 63 and having an annular groove 197 across which there extends a pin 198 driven into the block 111. The pin so fits the groove 197 that the screw 196 may be turned relative to the block 111. The screw 196 is turned by a cross pin 199 which extends through the screw and also an index wheel or cylindrical dial 200 bearing the indicia shown in Fig. 21 which cooperate with a pointer 201 secured by screws 202 to the saw frame 63. When the screw 196 and hence the roller 114 have been moved into the desired position the screw 196 is locked in position by lock nut 203 having an operating handle 204 as shown in Fig. 6.

Mechanism for feeding bar stock toward the saw

The mechanism for feeding the bar stock toward the saw will now be described with particular reference to Figs. 3, 13, 14, 22, 23, and 24. While the present invention is embodied in a machine for sawing into pieces a length of bar stock having the cross sectional contour as indicated by numeral 210 (see Figs. 13 and 24) it will be understood that the present invention is not limited to sawing bars of any particular shape. The bar stock 210 is formed in such shape that pieces thereof are adapted to be used as pole pieces for dynamo-electric machines. As the stock 210 is moved toward the saw 50 it slides along supports or ways 211, 212, and 213, ways 212 and 213 being separated for a purpose to be described. These ways rest upon a guide plate 215 and are secured by screws 214 with the guide plate 215 to a machine frame 40. The plate 215 provides a guide for a sliding feed-block 216 which the ways 211, 212, and 213 retain within the guiding channel provided by the plate 215. The block 216 is reciprocated by a lever 217 which as shown in Fig. 14 is connected by key 218 with a pivot shaft 219 journalled in ball bearings 220 and 221 retained by bosses 222 and 223 respectively integral with frame 40. Lever 217 carries a screw pin 224 providing a bearing for a roller 225 which cooperates with a cam 226 attached in any suitable manner to the cam shaft 119. The other end of the lever 217 is forked to provide a notch 227 for receiving a block 228 which is rotatably journalled on a pin 229 integral with the slide block 216.

The cam 226 operates only to oscillate the lever 217 in a clockwise direction as viewed in Fig. 3. The lever 217 is moved in a counterclockwise direction by spring 230 shown more particularly in Fig. 12. Spring 230 encircles a rod 231 and bears at one end against a bushing 232 and at the other end against a forked block 233 which straddles a lever 234 and which bears against a pin 235 carried by the lever 234, the fork arms of the block 233 each having a notch 236 for receiving one end of the pin 235. The bushing 232 is threaded into a block 240 which is journalled on trunnion screws 241 which are threaded into arms 242 of a bracket 243 attached by screws 244 to the frame 40. The bracket 243 provides a cover plate for an opening 245. The bushing 232 provides an oscillatable guide for one end of the rod 231. The bushing 232 is provided with flats 246 to which may be applied a wrench for turning the bushing 232 in order to adjust the compression of the spring 230. The lever 234 has a split hub 247 which cooperates with a screw 248 to clamp the lever 234 to the shaft 219. A key 249 is also employed to drivingly connect the lever 234 with the shaft 219.

The cam 226 operates upon the cam roller 225 in order to move the lever 217 clockwise and to move the slide block 216 away from the saw 50. When the cam 226 has released the roller 225, the spring 230 operates to move the lever 234 and hence the lever 217 in a counterclockwise direction thereby causing the work feeding slide 216 to move toward the saw a certain amount dependent upon the location of a stop rod 250 which is supported by the saw frame 63 as shown in Figs. 1 and 8. The rod 250 is guided in a recess 251 provided by the saw frame 63, by a sleeve 252 threaded at 253 into another portion of the frame 63. A spring 254 located between one end of the sleeve 252 and the shoulder 255 provided by the rod 250 urges the rod 250 toward the left until nut 256 strikes the right hand end of the sleeve 252. By changing the position of the nut 256 relative to the rod 250, the rod 250 will be moved endwise relative to the frame 63. Hence the relation between the stop 250 and the saw 50 may be varied in order that the length of the pieces cut off from the bar 210 can be varied. The sleeve 252 is provided with flats 257 to which a wrench may be applied for turning the sleeve 252 in order to provide another adjustment of the stop rod 250 relative to the saw 50. The sleeve 252 may be locked in adjusted position by lock nut 258.

When the slide 216 moves toward the saw 50 the work is moved thereby through the medium of a dog 260 which is pivoted at 261 upon the block 216 and which is provided with teeth which engage the work when the block 216 moves toward the right as viewed in Fig. 22. A spring 262 coiled around the pivot post 261 of the block 216 and having its ends anchored respectively in the dog 260 and in the block 216 urges the dog 260 in a counterclockwise direction and hence tends to press the dog against the work or bar stock 210. As explained before, the spring 230 shown in Fig. 12 operates to move the slide 216 toward the right and toward the saw 50 as shown in Fig. 22, the dog 260 gripping the work as the slide 216 moves toward the right. The amount of movement of the slide 216 will depend on the position of the stop rod 250 which limits the amount of travel of the work toward the saw and determines the length of the piece which will be cut off. As explained before the cam 226 operates upon the roller 225 to move the block 216 away from the saw. During the movement of the block away from the saw the dog 260 is dragged along the work, its teeth being released from the work.

In order that the work will not be dragged away from the saw and stop while the slide 216 moves away therefrom means are provided for automatically clamping the work against the ways 211 and 213. This clamping means includes a clamping bar 270 having a clamping end 271 adapted to fit the work and having a floating pivot provided by a block 272 journalled on a pin 273 and received by an oblong aperture 274 in the bar 270 and providing clearance for the block 272 in order that the clamping bar 270 may be horizontally movable relative to its pivot end 273. In this way the bar 270 automatically adjusts itself to the bar stock 210. The pin 273 is journalled in bearings 275 (see Fig. 16) which are carried by post 276 provided by a bracket 277 attached by one or more screws 278, to the machine frame 40. The ends of the pin 273 are received by suitable holes in the arms 277a of a forked lever 278a, the other end of which is forked to provide arms 279 which support a pin 280 which also supports a ball bearing 281 providing a journal for a cam roller 282. Roller 282 cooperates with the cam 283 attached to the cam shaft 119 by a key 284 and a set screw 285. Motion is transmitted from the lever 278a to the lever 270 by a button 286 carried by lever 278 and adapted to receive the lower end of a screw 287 threaded through the lever 270. By turning the screw 287 the angular relation between the levers 278 and 270 may be varied, and by tightening the lock nut 288 the screw 287 may be secured in adjusted position. The lever 270 may be moved away in a clockwise direction from the work as viewed in Fig. 13 by a spring 289 located between the guide plate 215 and the lever 270 and located within a suitable recess in the way 211. It appears from the chart in Fig. 29 that the feed block arrives in advanced position before the clamping bar 270 moves into clamping engagement with the bar stock and in order to assure that the bar stock remains clamped to the feed block 216 while the clamping bar 270 is inactive, the yielding stop 250 performs an additional function, namely, it exerts a force against the bar stock, which force causes the dog 260 to maintain in gripping engagement with the bar stock as can be readily understood. This latter feature is of considerable importance where a short remainder has to be cut once more in which case the remainder might cant over the end of the guideways 211, 212 and 213 and fall off if the dog 260 would not effectively hold such remainder on the guideways while the clamping bar 270 is inactive.

Normally the dog 260 operates to prevent pulling the bar stock 210 out from the left hand end of the feed bar 216 as viewed in Fig. 22. This is apparent because movement of the bar 210 will drag the dog 260 in a counterclockwise direction thereby causing its teeth to dig into the work and cause it to be bound tightly against the side wall 211a of the way 211 as shown in Figs. 13 and 22. Means are provided for releasing the dog 260 so that the work bar 210 may be removed. This is accomplished by turning a knob 291 in a clockwise direction as viewed in Fig. 22. The knob 291 is pinned to a shaft 292 journalled at 293 in the feed bar 216 and providing a cam 294 adapted to engage a sliding bar 295 guided by a suitable groove 296 provided by the feed bar 216. Hence, when the knob 291 is turned clockwise as viewed in Fig. 22 the cam 294 will engage the bar 295 and cause it to move toward the right until it engages the dog 260 and causes it to move in a clockwise direction away from contact with the bar stock 210. A pin 292a which extends through the slide 216 and a groove 292b in the shaft 292 prevents removal of the shaft 292.

*Control of the machine*

As explained before the angular motion of the feed bar lever 217 in a counterclockwise direction as viewed in Fig. 3 is dependent on the relation between the left hand end of the stop 250 and the saw 50. Quite obviously this amount of angular motion of lever 217 is dependent on whether any more stock remains upon the feeding mechanism after a cutting operation. If the piece of stock which remains gripped by the dog 260 after a preceding cutting operation is substantially less than the length of the piece normally cut off by the machine there will not be a sufficient length of bar stock remaining upon the ways to provide a surface which is coextensive with the movement of the dog 260 as it is caused to recede from the saw. Hence, the dog 260 will drop in behind the left end of the remaining bar stock, and will, on the next movement of the feed bar to the right, engage the remaining end of bar stock and will cause the same to be pushed over the ends of the ways whereupon it will descend upon a chute 420 to be described later. Following this the feed bar will continue to move a distance toward the right greater than normal when there remains sufficient stock to cut a full-length piece, consequently there is an extra counterclockwise movement of lever 217. This extra counterclockwise movement of the lever 217 which may take place when the stock has all been cut up into pieces is made use of in operating a device for automatically stopping the machine, or at least stopping the rotation of the cam shaft 119.

Normally the lever 217 and hence the lever 234 shown in Fig. 12 will move counterclockwise into the position shown in Figs. 3 and 12 respectively after having fed the bar of stock against the stop 250. Movement of these levers into these positions is accompanied by movement of a lever 300, which is drivingly connected with the shaft 219, and by movement of a bar 301 pivotally connected with lever 300 at 302 into the position shown in Fig. 12. So long as the bar 301 moves no further toward the right than shown in Fig. 12 the machine will remain in operation. But, should there be no more stock in the feeding mechanism the spring 230 will be permitted to expand to a greater extent than normally in order to move the levers 234 and 300 and the bar 301 a greater distance toward the right than that shown in Fig. 12. When this occurs the cam shaft 119 will cease operation. This result is accomplished by causing the clutch members 171 and 172 to be separated by this extra movement of the bar 301 toward the right as viewed in Fig. 12. The bar 301 is provided with a forked end defining a notch 303 which receives a latch lever 304 shown in Fig. 9. The lever 304 is received by a notch 305 provided by a clutch shifting rod 306 carrying a clutch shifter 306a which is slidably supported for longitudinal movement parallel with the shaft 142 by providing guiding recesses 307 and 308 located respectively in a packing gland member 309 and in a bearing bracket 310 which provides one of the bearings for the shaft 142. The lever 304 is attached to a shaft 311 journalled in a bearing 312 shown in Fig. 9 which bearing is provided by the bracket 310. Outside the bracket 310 the shaft 311 is attached to an operating handle 312a. A spring 313 which is located between the bracket 310 and the collar 314 pinned to the rod 306 tends to urge the rod 306 in a direction for separating the clutch 171 from the clutch 172. When a greater movement of the bar 301 takes place as the result of there being no bar stock remaining in the feeding mechanism that portion of the bar 301 defining the left hand end of the notch 303 will engage the lever 304 and cause the same to be removed from the notch 305 of rod 306, thereby releasing spring 313 which in turn moves the rod 306 in a direction to separate the clutch member 171 from the clutch member 172. Therefore it is apparent that the machine will stop, that is, the cam shaft 119 will cease rotating because it is disconnected from the power shaft 156.

Before the machine can be started again another bar of stock must first be placed in position by first placing the bar upon the ways 211, 212, and 213 and pushing the bar toward the right until it engages the stop 250. Then the shaft 142 is manually rotated in order to turn the cam shaft 119 a sufficient distance to cause the cam 226 to rotate the lever 217 to a position corresponding with its normal limit of swing in a counterclockwise direction. After the shaft 142 has been thus rotated the bar 301 will have been moved to such position that the latch lever 304 may be returned to latching position by operating the lever 312. In order to restore the rod 306 to clutch engaging position it is moved outwardly against the compression of spring 313 by turning lever 320 in a clockwise direction as viewed in Fig. 9. Lever 320 is pivoted at 321 upon a bracket 322 attached to the bearing bracket 310, and has a forked lower end 323 which straddles the rod 306 and which is adapted to engage a pin 324 attached to rod 306. The shaft 142 is turned manually by a handle 330 having its hub 331 slidable upon the shaft 142 and providing a clutch 332 adapted to engage a clutch 333 attached to the shaft 142. A spring 334 normally maintains the clutch 332 out of engagement with the clutch 333.

Therefore, it is apparent that the machine is started again after having automatically stopped in response to the completion of the cutting of a bar of stock into pieces, by first placing a new bar upon the ways in the machine and moving it against the stop 250. Then the handle 330 is moved along the shaft to engage the clutch member 332 with the clutch member 333 and the handle 330 is turned in a direction which will turn the cam 226 sufficiently to return the levers 217 into a position substantially as shown in Fig. 3 so that the latch lever 304 will be released on the bar 301. Then, by pushing the handle 320 toward the machine the clutch 171 will be engaged with the clutch 172. Before releasing the handle 320 the lever 312 is operated in a counterclockwise direction as viewed in Fig. 1 in order that the latch lever 304 may bear against the clutch shifting rod 306 and hold the same in clutch engaging position after the handle 320 has been released. The machine may be stopped at any time manually by moving the lever 312a in a clockwise direction as viewed in Fig. 1.

*Automatic stopping of machine in response to dulling the saw*

The present invention provides also a device for stopping the machine in response to the dulling of the saw, but then only after a saw cut has been completed having been once started.

In the diagram shown in Fig. 2 numeral 80 designates an electric motor of the three phase induction type having its stator terminals connected with switch terminals 341, 342 and 343 respectively which are connected with movable switch contacts 345, 346 and 347 respectively adapted to be moved simultaneously into an engagement with switch contacts 349, 350 and 351 respectively to which the main line wires 353, 354 and 355 are respectively connected. The switch members 345, 346 and 347 are insulated from one another and are connected with an operating rod 356 urged by a spring 357 toward the left but capable of being actuated toward the right by an electro-magnet comprising a winding 358 and an armature 359. Winding 358 is connected with line wire 354 and with a stationary contact 360 normally engaged by a leaf spring conductor 361. The line wire 355 is connected by wire 362 with a stationary switch contact 363 normally out of engagement with a leaf spring conductor 364. Conductors 361 and 364 are connected by wire 365 and a switch contact 366 which is connectible by a switch blade 367 with a switch contact 368. Blade 367 is insulated from the other blades and is actuated also by rod 356. The switch contacts 343 and 368 are bridged by two switches in parallel.

One switch is temperature responsive and comprises a stationary contact 370 connected by a wire 371 with contact 343 and engageable by a movable contact 372 pivoted at 373 and connected with wire 375 which is connected with contact 368. Contact 372 includes an arm 376 carrying a non-conducting block 377 which is engaged by a compression spring 378 bearing against a stationary stop 379. The spring 378 tends to urge the movable contact 372 in a clockwise direction as viewed in Fig. 2, thereby tending to separate the contact 372 from contact 370. Normally this will not take place for the reason that the block 377 is engaged by a latch 380 normally maintained in latching position by a blade 381 of bimetallic material fixed to a block 382. This blade 381 is surrounded by a heating coil 383 connected in series with the motor 80.

The other switch which bridges the contacts 343 and 368 comprises a pair of contacts 390 and 391 connected respectively with a circuit breaker lever 392 and wire 375. Lever 392 is connected with wire 371 and is provided with a non-conducting cam-rubbing block 393 which co-operates with a machine driven cam 394 having a lobe 395. A spring 396 located between the lever 392 and a stationary part 397 urges the lever 392 toward the cam 394. The cam 394 is so coordinated with the saw frame 63 that the lobe 395 engages the cam follower 393 to separate the contact 390 from the contact 391, only after the saw frame has been raised from the work following the completion of a cutting operation.

To start the machine the operator presses a push button 364a to cause the contact 364 to engage the contact 363 whereupon a circuit through the electro-magnet winding 358 will be completed. Consequently the switch blades 345 and 346, 347 and 367 will be moved simultaneously into engagement with switch contacts 349, 350, 351 and 366 respectively. The motor 80 will be then connected with a source of current led in through the line wires 353, 354, and 355. The push button 364a may then be released, thence the circuit through the holding magnet coil 358 is completed through the following circuit: wire 355, contact 351, blade 347, contact 343, wire 371, switch contact 370 and 372 to wire 375 or through contacts 390 and 391 to wire 375, wire 375, contact 368, blade 367, contact 366, wire 365, blade 361, contact 360, coil 358, wire 354. So long as the saw 50 maintains a certain degree of sharpness the current required for operating the motor 80 will be insufficient to heat the thermostat blades 381 to cause it to bend sufficiently to move the latch 380 away from the block 377. However, if the saw becomes dulled to a certain extent causing it to meet with a certain resistance by reason of its dullness the current consumed by the motor and hence by the heating coil 383 will be sufficient to cause the thermostat blade 381 to bend a distance sufficient to cause the latch 380 to move away from the block 377 thereby permitting the spring 378 to move the contact 372 away from the contact 370. When this occurs the circuit through the magnet coil 358 would be interrupted if at the same time the switch contact 390 were separated from the contact 391. However, if these contacts are closed at the time contact 372 is separated from the contact 370 the machine will continue operation until the cam lobe 395 has engaged the block 393 and has caused the contact 390 to separate from the contact 391. As explained before this will not occur until after the saw has completed a cut and has receded from the work. Therefore, the present system of control provides for stopping the machine automatically when the dullness of the saw has exceeded a certain amount, and then only after the saw has completed a cut, having once started it.

While the wiring diagram shown in Fig. 2 shows a separate cam for operating the switch contact 390 the present machine is so constructed that the saw frame 63 can be employed to operate the contact 390 thus dispensing with the cam 394 in actual practice. Referring to Figs. 3 and 5 the nut 195 having threaded engagement with the screw 193 attached to the spring 190 is used to attach to the saw frame 63 a non-conducting block 400 which extends over a leaf spring conductor carrying the contact 390 and corresponding in function to the lever 392 of the wiring diagram. The contact 391 is carried by a bracket 402. The blade 401 and the bracket 402 are insulatingly supported by the clamp bracket cap 403 which is attached by screws 404 to the bracket 65 and which cooperates therewith to hold the stationary shaft or rod 64. When the saw frame moves the saw away from the work the block 400 will engage the blade 401 to cause the contact 390 to separate from the contact 391.

Fig. 29 shows diagrammatically the sequence of operation of the various mechanism controlled by the cam shaft 119. The base line of the diagram is graduated from 0° to 360° to represent the 360 degrees of rotation of the cam shaft 119. The zero degree position corresponds to the position of the saw frame when the cutting of the work commences. The line A—B—C—D—E—A represents the movement of the saw frame. During the first 275 degrees of rotation of the shaft 119 the saw frame gradually advances toward the work at a substantially uniform rate. Line B—C represents movement of the saw frame at a greater rate while the saw has cut the stock partly through. Line C—D represents a quick movement of the saw frame away from the work after completing the cut. D—E represents a dwell during which time the work is fed into a succeeding position. Line E—A represents a rapid advancing of the saw frame toward the work followed by a retardation just before the saw begins to cut.

The line G—H—I—J—K—G represents the status of the switch contact 390 during the periods represented by the line G—H and K—G the switch 390 engages the contact 391. During the time represented by line I—J the contact 390 is separated from the contact 391, the contact separation takes place shortly before the saw frame has swung away from the work or at a time represented by the point D on the diagram. This control of the switch conforms to what has been explained with reference to the wiring diagram shown in Fig. 2. The switch contact 390 will engage the contact 391 to close the circuit in shunt with the thermostat switch shortly after the saw frame begins to approach the work as represented by the line E—F.

The line M—N—O—P—Q—M represents the cycle of operations of the feeding mechanism. Between zero and 190°, represented by a line M—N, and between 327° and 360°, represented by line Q—M, the feed bar is at rest in forward position. While the saw is finishing the cut the cam 226 operates to retract the feed bar between 190° and about 265° represented by the line N—O. While the saw frame is being retracted from the work as represented by the line C—D the feed bar is released from the cam and is spring actuated toward the saw as represented by the line P—Q.

The line R—S—T—U—V—S represents the operation of the clamp bar 270. Between zero and 285° represented by the line R—S and between 340° and 360° represented by the line V—S the clamp engages the work. Between about 290° and 330° represented by the line T—U the clamp is removed from the work so that the feeding may take place as represented by the line P—Q. In this connection it should be noted that the feed bar 270 occupies a position relatively close to the saw 50 as shown in Fig. 3 so that the piece remaining after sawing the bar of stock into the largest number of required lengths will be as short as possible thereby minimizing the amount of stock wasted. The motor 80 is stopped manually by pressing a button 361a (see Fig. 2) to render the electro-magnet coil 358 inoperative to hold the motor switch closed against the tension of spring 357.

Cooling and lubrication of the saw

While the bar of stock is being cut by the saw the end being cut off is yieldingly urged downwardly by two spring pressed plungers 410 guided by tubes 411 attached to a bracket 412 secured to the saw frame 63 by dowel pins 413 and a single screw 414. The bracket 412 is attached to two tubes 415 in alignment with the tube 411 and having threaded ends receiving cap 416 in order to retain spring 417 which press downwardly upon the heads 418 of the plungers 410. These plungers 410 assist in bending the piece being cut off away from the saw particularly near the end of the cutting operation and also assist in quickly moving the piece cut off in its downward course from the saw. As the piece falls from the saw it falls upon a chute 420 which is provided by a grating of spaced, parallel rods 421 and side pieces 422 welded to cross strip 423 and supported in any suitable manner by the machine frame 40 as shown in Fig. 11.

Referring to Figs. 25 and 26 the saw 50 is partly surrounded by a guard 430 detachably secured to the bracket 412 by providing the bracket with a lug 431, grooves 432, (see Figs. 27 and 28) which receive the portions 435 of L-shaped lugs 434 provided by the guard 430. The guard 430 is provided with semicircular bearings 430a which rest upon the saw shaft 52. The guard 430 is retained by a spring clip 436 attached by screws 437 to the lug 431, the clip providing a loop 438 adapted to bear against the upper surface of the guard.

The guard 430 provides an oil nozzle into which oil is conducted through a coupling 439 connected with a flexible oil pipe 440. Referring to Figs. 6 and 9, the pipe 440 is connected with a rigid pipe 441 leading from a rotary oil pump 442, driven by shaft 460, sprocket 461 attached to shaft 460, and chain 462 connecting sprocket 461 with sprocket 154. A guard 463 encloses the sprocket 154 and 461 and chain 462. The pump 442 is connected by the pipes shown with a strainer 443 located within an oil reservoir 444 shown in cross section in Fig. 11. The saw is bathed in oil to prevent it from overheating. The oil and metal cuttings collect upon a pan 445 having an opening at 446 located above a tray 447 for collecting the metal cuttings. The oil collected in the tray 447 will overflow and return to the reservoir 444. The tray 447 is slidably supported upon angle bars 448; and when filled it is pulled out toward the left as viewed in Fig. 11 and while its edge 449 is still supported by the outer ends of the angle bars 448 the tray is still lifted upwardly and toward the machine to permit oil to flow over the edge 450 into the reservoir 444 while the most of the cuttings remain in the tray. As the work pieces slide down the chute 420 particles of cuttings and oil clinging thereto may have opportunity to drop between the grating bars 421 into the tray.

While the form of embodiment of the present invention as herein disclosed, constitutes a preferred form, it is to be understood that other forms might be adopted, all coming within the scope of the claims which follow.

What is claimed is as follows:

1. A machine for cutting bar stock comprising, in combination, a rotary cutter; a power operated frame supporting and bodily moving the cutter toward and away from the bar stock; a support for receiving the bar stock; a reciprocable mechanism for feeding the stock a certain distance along the support and for ejecting from said support the remainder of the stock which is shorter than said certain distance; and means responsive to an ejecting operation of the mechanism for rendering the power operated frame ineffective.

2. A machine for cutting bar stock comprising, in combination, a rotary cutter bodily movable at right angles to its axis of rotation; a support for receiving the bar stock; a power reciprocated mechanism for feeding the stock a certain distance along the support and for ejecting from said support the remainder of the stock which is shorter than said certain distance; and means responsive to an ejecting operation of the mechanism for stopping reciprocation of the mechanism.

3. A machine for cutting bar stock comprising, in combination, a rotary cutter; a power operated mechanism for bodily moving the cutter toward and away from the bar stock; a support for receiving the bar stock; a power reciprocated mechanism for feeding the stock a certain distance along the support and for ejecting from said support the remainder of the stock which is shorter than said certain distance; and means responsive to an ejecting operation of the feeding mechanism for rendering both mechanisms ineffective.

4. A machine for cutting bar stock comprising, in combination, a rotating cutter bodily movable at right angles to its axis of rotation; guideways for supporting the bar stock for movement toward the cutter, said guideways being located at one side of the plane of rotation of the cutter; a stop at the other side of the plane of rotation of the cutter and in alignment with the bar stock; a feed block reciprocable parallel to the guideways toward and away from a predetermined position most retracted from the cutter; means operable positively to retract the feed block from the cutter; yielding means for advancing the feed block toward the cutter; means carried by the feed block for clamping the bar stock to said feed block in response to an advancing movement of the latter toward the cutter whereby the bar stock is fed into engagement with the stop, the distance between the plane of rotation of the cutter and said clamping means in most advanced position of the feed block being less than the distance between said plane of rotation and the stop; and second means operable for clamping the bar stock to the guideways intermediate the cutter and the first mentioned clamping means in most advanced position of the feed block.

5. A machine for cutting bar stock comprising, in combination, a rotating cutter bodily movable at right angles to its axis of rotation; guideways for supporting the bar stock for movement at right angles to the plane of rotation of the cutter, said guideways being located at one side of said plane of rotation of the cutter; a stop at the other side of the plane of rotation of the cutter and in alignment with the bar stock; a feed block movable parallel to the guideways toward and away from a predetermined position most retracted from the cutter; means operable positively to retract the feed block from the cutter; yielding means for advancing the feed block toward the cutter; means carried by the feed block for clamping the bar stock to said feed block in response to an advancing movement of the latter toward the cutter whereby the bar stock is fed into engagement with the stop, the distance between the plane of rotation of the cutter and said clamping means in most advanced position of the feed block being less than the distance between said plane of rotation and the stop; and means operable for clamping the bar stock to the guideways intermediate the cutter and the first mentioned clamping means in most advanced position of the feed block.

6. A machine for cutting bar stock comprising, in combination, a rotating cutter; a plate having guideways for supporting the bar stock for movement toward the cutter, said plate being located at one side of the plane of rotation of the cutter; a stop at the other side of the plane of rotation of the cutter and in alignment with the bar stock; a feed block mounted on the plate for movement parallel to the guideways; means carried by the plate and being operable positively to move the feed block away from the cutter into a predetermined end position most retracted from the cutter; yielding means carried by the plate for advancing the feed block toward the cutter; means carried by the feed block for clamping the bar stock to said feed block in response to an advancing movement of the latter whereby the bar stock is fed into engagement with the stop, the distance between the plane of rotation of the cutter and said clamping means in most advanced position of the feed block being less than the distance between said plane of rotation and the stop; means carried by the plate and being operable to clamp the bar stock to the guideways intermediate the cutter and the first mentioned clamping means in most advanced position of the feed block; and means for causing relative bodily movement between the cutter and the plate in a direction at right angles to the axis of rotation of the cutter.

7. A machine for cutting bar stock comprising, in combination, a rotating cutter; a plate having guideways for supporting the bar stock for movement toward the cutter, said plate being located at one side of the plane of rotation of the cutter; a stop at the other side of the plane of rotation of the cutter and in alignment with the bar stock; a feed block movable parallel to the guideways, means operable positively to move the feed block away from the cutter into a predetermined end position most retracted from the cutter, yielding means for advancing the feed block toward the cutter; means carried by the feed block for clamping the bar stock to said feed block in response to an advancing movement of the latter whereby the bar stock is fed into engagement with the stop, the distance between the plane of rotation of the cutter and said clamping means in most advanced position of the feed block being less than the distance between said plane of rotation and the stop; means carried by the plate and being operable to clamp the bar stock to the guideways intermediate the cutter and the first mentioned clamping means in most advanced position of the feed block; and means for causing relative movement between the cutter and the plate in a direction at right angles to the axis of rotation of the cutter.

8. A machine for cutting bar stock comprising, in combination, a rotating cutter bodily movable at right angles to its axis of rotation; guideways for supporting the bar stock for movement toward the cutter, said guideways being located at one side of the plane of rotation of the cutter; a yielding stop at the other side of said plane of rotation of the cutter and in alignment with the bar stock; a feed block movable parallel to the guideways; means operable positively to retract the feed block from the cutter into a predetermined end position most retracted from the cutter; yielding means for advancing the feed block toward the cutter; a pivotally mounted dog on the feed block for clamping the bar stock to said feed block during an advancing movement of the latter whereby the bar stock is fed into engagement with the stop and slightly depresses the latter against its tendency to assume normal position whereby a yielding force is transmitted from the stop to the bar stock which causes the dog to maintain the bar stock clamped to the feed block while the latter is in a most advanced position, the distance between the plane of rotation of the cutter and the dog in most advanced position of the feed block being less than the distance between said plane of rotation and the stop; and means operable to clamp the bar stock to the guideways intermediate the cutter and the dog in most advanced position of the feed block.

9. A machine for cutting bar stock comprising, in combination, a rotating cutter; a plate having guideways for supporting the bar stock for movement toward the cutter, said plate being located at one side of the plane of rotation of the cutter; a yielding stop at the other side of said plane of rotation of the cutter and in alignment with the bar stock; a feed block mounted on the plate for movement parallel to the guideways; means carried by the plate and operable positively to retract the feed block from the cutter into a predetermined end position most retracted from the cutter, yielding means carried by the plate for advancing the feed block toward the cutter; a pivotally mounted dog on the feed block for clamping the bar stock to said feed block during an advancing movement of the latter whereby the bar stock is fed into engagement with the stop and slightly depresses the latter against its tendency to assume normal position whereby a yielding force is transmitted from the stop to the bar stock which causes the dog to maintain the bar stock clamped to the feed block while the latter is in a most advanced position, the distance between the plane of rotation of the cutter and the dog in most advanced position of the feed block being less than the distance between said plane of rotation and the stop; means carried by the plate and being operable to clamp the bar stock to the guideways intermediate the cutter and the dog in most advanced position of the feed block; and means for causing relative bodily movement between the cutter and the plate in a direction at right angles to the axis of rotation of the cutter.

10. A machine for cutting bar stock comprising, in combination, a rotating cutter bodily movable at right angles to its axis of rotation; guideways for supporting the bar stock for movement toward the cutter, said guideways being located at one side of the plane of rotation of the cutter; a stop at the other side of said plane of rotation of the cutter and in alignment with the bar stock; a feed block movable parallel to the guideways; means operable positively to retract the feed block from the cutter into a predetermined end position most retracted from the cutter; yielding means for advancing the feed block toward the cutter; a pivotally mounted dog on the feed block for clamping the bar stock to said feed block during an advancing movement of the latter whereby the bar stock is fed into engagement with the stop, the distance between the plane of rotation of the cutter and the dog in advanced position of the feed block being less than the distance between said plane of rotation and the stop; and means operable to clamp the bar stock to the guideways intermediate the cutter and the dog in advanced position of the feed block, the remainder of bar stock being removed from the guideways by the yieldingly advanced feed block when said bar stock remainder is too short to engage the stop while still within reach of the clamping means.

11. A machine for cutting bar stock comprising, in combination, a rotating cutter; a plate having guideways for supporting the bar stock for movement toward the cutter, said plate being located at one side of the plane of rotation of the cutter; a stop at the other side of said plane of rotation of the cutter and in alignment with the bar stock; a feed block movable parallel to the guideways; means operable positively to retract the feed block from the cutter into a predetermined end position most retracted from the cutter; yielding means for advancing the feed block toward the cutter; a pivotally mounted dog on the feed block for clamping the bar stock to said feed block during an advancing movement of the latter whereby the bar stock is fed into engagement with the stop, the distance between the plane of rotation of the cutter and the dog in advanced position of the feed block being less than the distance between said plane of rotation and the stop; means carried by the plate and being operable to clamp the bar stock to the guideways intermediate the cutter and the dog in advanced position of the feed block, the remainder of bar stock being removed from the guideways by the yieldingly advanced feed block when said bar stock remainder is too short to engage the stop while still within reach of the clamping means; and means for causing relative bodily movement between the plate and the cutter in a direction at right angles to the axis of rotation of the latter.

12. A machine for cutting bar stock comprising, in combination, a rotating cutter bodily movable at right angles to its axis of rotation; a plate having guideways for supporting the bar stock for movement toward the cutter, said plate being located at one side of the plane of rotation of the cutter; a stop at the other side of said plane of rotation of the cutter and in alignment with the bar stock; a feed block movable parallel to the guideways; means operable positively to retract the feed block from the cutter into a predetermined end position most retracted from the cutter; yielding means for advancing the feed block toward the cutter; means carried by the feed block for clamping the bar stock to the feed block in response to an advancing movement of the latter whereby the bar stock is fed into engagement with the stop, the distance between the plane of rotation of the cutter and said clamping means in most advanced position of the feed block being less than the distance between said plane of rotation and the stop; and means operable to clamp the bar stock to the guideways, said means comprising a lever pivotally mounted on the plate and a rotatable cam which upon rotation rotates said lever from a retracted position into clamping engagement with the bar stock intermediate the cutter and the first mentioned clamping means in most advanced position of the feed block, said cam determining the most retracted position of the lever in which the latter prevents the shortest possible remainder of bar stock to be cut from canting over and falling off the end of the guideways, the shortest possible remainder of bar stock to be cut being of a length equal to the distance between the clamping lever and the stop.

13. A machine for cutting bar stocking comprising, in combination, a bodily movable cutter; a support for the bar stock; means operable for clamping the bar stock to the support; and reciprocable means adapted during a forward stroke to grip and feed the bar stock on the support past the cutter, said means moving into clamping alignment with the clamping means at the end of its forward stroke.

14. A machine for cutting bar stock comprising, in combination, a rotary cutter bodily movable at right angles to its axis of rotation; guideways located at one side of the plane of rotation of the cutter and adapted to support the bar stock for movement toward the cutter; a stop located at the other side of the plane of rotation of the cutter and in alignment with the bar stock; a feeding block reciprocable parallel to the guideways toward and away from a predetermined position most retracted from the cutter; and means carried by the feed block for clamping the bar stock to said feed block in response to advancing movement of the latter toward the cutter whereby the bar stock is fed into engagement with the stop, the distance between the plane of rotation of the cutter and said clamping means in most advanced position of the feed block being less than the distance between the said plane of rotation and the stop.

15. A machine for cutting bar stock comprising, in combination, a rotating cutter bodily movable at right angles to its axis of rotation; guideways located at one side of the plane of rotation of the cutter and adapted to support the bar stock for movement toward the cutter; a yielding stop at the other side of the plane of rotation of the cutter and in alignment with the bar stock; a feed block reciprocable parallel to the guideways; and a pivotally mounted dog on the feed block for clamping the bar stock to said feed block during an advancing movement of the latter whereby the bar stock is fed into engagement with the stop and depresses the latter against its tendency to assume normal position whereby a yielding force is transmitted from the stop to the bar stock which causes the dog to maintain the bar stock clamped to the feed block while the latter remains in most advanced position.

LEO C. SHIPPY.
ALVA W. PHELPS.
JOHN Q. HOLMES.